United States Patent [19]

Leo et al.

[11] 4,092,285
[45] May 30, 1978

[54] ENCAPSULATION OF CRITICAL CHEMICALS

[75] Inventors: Thomas J. Leo, Yardley; Michael J. Reynolds, Morrisville, both of Pa.

[73] Assignee: Wyrough and Loser, Inc., Trenton, N.J.

[21] Appl. No.: 710,115

[22] Filed: Jul. 30, 1976

[51] Int. Cl.$^2$ ............................................ C08L 91/00
[52] U.S. Cl. ..................... 260/28.5 R; 260/23 XA; 260/23.7 R; 260/23.7 A; 260/28.5 B; 260/31.8 HR; 260/31.8 R; 260/31.8 DR; 260/33.6 AQ; 260/33.6 PQ; 260/33.6 UA; 260/45.75 N; 260/45.75 V; 260/45.9 QA; 260/45.9 D; 260/45.7 S; 260/45.7 SW; 260/745; 260/757; 260/759; 427/212; 427/220; 427/221; 427/222; 260/31.8 G
[58] Field of Search ................. 260/28.5 R, 28.5 B, 260/31.8 HR, 31.8 PQ, 31.8 G, 31.8 R, 31.8 DR, 33.6 AQ, 33.6 PQ, 33.6 UA, 23 XA, 23.7 R, 45.75 N, 45.75 V, 45.9 QA, 45.9 DI, 45.7 S, 45.75 W, 745, 757, 759, 23.7 A; 427/212, 220, 221, 222

[56] References Cited

U.S. PATENT DOCUMENTS

| | | | |
|---|---|---|---|
| 2,598,209 | 5/1952 | Bartram | 260/793 |
| 2,653,924 | 9/1953 | Olin | 260/793 |
| 2,888,444 | 5/1959 | Roberts et al. | 260/79.5 |
| 3,012,985 | 12/1961 | Zakheim et al. | 260/33.6 |
| 3,251,798 | 5/1966 | Pollien | 260/34.2 |
| 3,491,052 | 1/1970 | Hare et al. | 260/29.7 |
| 3,553,125 | 1/1971 | Watters | 260/759 |
| 3,562,193 | 2/1971 | Luks et al. | 260/4 |
| 3,580,519 | 5/1971 | Klein et al. | 241/22 |
| 3,630,905 | 12/1971 | Sorgo | 260/33.6 AQ |
| 3,717,600 | 2/1973 | Dalhuisen et al. | 260/23 H |
| 3,738,948 | 6/1973 | Dunnom | 260/33.6 AQ |
| 3,912,684 | 10/1975 | Callan | 260/33.6 AQ |
| 3,923,680 | 12/1975 | Reeder et al. | 252/182 |
| 3,929,715 | 12/1975 | Nowell et al. | 260/33.6 AQ |

*Primary Examiner*—Melvyn I. Marquis
*Attorney, Agent, or Firm*—Edward S. Irons; James R. Laramie

[57] ABSTRACT

A composition of matter useful for dispersing a critical chemical in a rubber or plastic compound, said composition comprising from about 60 to about 95 percent by weight of a critical chemical and from about 5 to about 40 percent by weight of a binder, said binder comprising at least one component selected from (i) liquids compatible with said rubber or plastic compound and with the other binder components and (ii) waxes having a sharp melting point in the range of 55°–80° C, and a polymer having a molecular weight of at least about 50,000 which when combined with the other binder components produces a binder which is a non-tacky gel below about 53° C. The composition can additionally comprise a fine powder reinforcing agent, which can also serve as a stabilizer for the binder.

93 Claims, No Drawings

ENCAPSULATION OF CRITICAL CHEMICALS

BACKGROUND OF THE INVENTION

1. Field of the Invention

The invention relates to a method of encapsulating critical rubber and plastic chemicals. More particularly, the invention relates to novel compositions comprising critical rubber or plastic chemicals and binders which mix rapidly and homogeneously with the rubber or plastic compositions to which they are added.

2. Description of the Prior Art

In the processing of rubber and plastic compositions, certain chemicals that play an important function in the final compound must be added in relatively small amounts, generally in the range of 0.1 to 5 percent by weight of the final compound although occasionally as high as 20 percent by weight. These chemicals must be added in certain critical proportions so that the desired processing conditions and/or physical properties of the finished or manufactured product are uniformly reproducible. Small variations in the amount or distribution of these chemicals in the final compound will cause serious variations in the processing and/or physical properties of the final compound. Because of the accuracy with which these chemicals must be added to rubber or plastic compositions, they have been termed "critical chemicals." Examples of critical chemicals include vulcanizing agents, curing agents, and cross-linking agents, accelerators and retardants for such agents, antidegradants, antioxidants, antiozonants, blowing agents, blowing agent activators, pigments, colorants, cure modifiers, flame retardants, chemical and heat stabilizers, reinforcing agents, resins, inhibitors, catalysts which extend polymer chains, and the like. Clay or oil, for example, would not be considered critical chemicals in a typical batch of 500 pounds of a rubber compound since they function as diluents and variations of 5 to 10 pounds from batch to batch would hardly be noticed. Variations of 3 or 4 ounces of accelerator or vulcanizing agent in a typical batch, however, can significantly change the physical properties of the final compound and/or its processing properties.

Prior to the present invention, various methods were employed for dispersing or encapsulating critical chemicals. One such method is master-batching. This is generally accomplished for both rubber and plastics on two-roll mills or in internal mixers, such as the Banbury type. The products so produced can subsequently be formed into shapes convenient for packaging and weighing. When two-roll mills are employed, dwell times are relatively long. Although labor costs are lower when internal mixers are used, higher temperatures and, therefore, more heat history are generally encountered. Furthermore, energy costs are high and the quality of chemical dispersion is generally inferior to the products of two-roll mills.

Another prior art method involves the formation of pastes of the critical chemicals. The binder compositions for such pastes include various oils and other plasticizers, low molecular weight, non-crystalline polymers, and waxes. The pastes can be prepared in apparatus such as mullers and three-roll mills, which can subsequently be formed into various shapes by extrusion or molding. U.S. Pat. No. 3,000,841 discloses the preparation of such pastes.

A further prior art method involves surface treatment. This procedure does not constitute true dispersion and generally accomplishes only partial encapsulation. Treatment is with various liquids, such as oils or propionic acid, and is carried out in apparatus such as ribbon blenders and Patterson-Kelly Twin Cone mixers.

SUMMARY OF THE INVENTION

The disadvantages and limitations of the prior art methods are alleviated by the present invention. In accordance with the present invention, critical chemicals are encapsulated in a binder comprising a relatively minor amount of a high molecular weight polymer, a relatively major amount of a liquid compatible with the rubber or plastic compound to which the critical chemical is to be added, and/or a relatively major amount of a wax. The binder may additionally contain a very minor amount of a fine powder reinforcing agent, which can also act as a stabilizer for the binder.

Suitable binder compositions are prepared in accordance with the following procedures. First, the liquid or wax component is heated to about 60°-150° C. The other binder ingredients are then added under slow agitation to the heated liquid or wax. If a minor amount of a fine powder reinforcing agent is to be added, it should be added to the other ingredients so that it forms a uniform admixture therewith and does not settle out. In a binder system containing only heat stable, high molecular weight polymer and wax components, the polymer is added to the heated wax under slow agitation. If a minor amount of a fine powder reinforcing agent is also required, it may be added just prior to or simultaneously with addition of the polymer. In binder systems containing only polymer and liquid, or polymer, liquid and wax, the polymer is added to the heated liquid under slow agitation followed by addition of the wax when employed. The fine powder reinforcing agent, if required, may be added to the heated liquid simultaneously with the polymer.

If the high molecular weight polymer used in the binder component is heat sensitive, such as natural rubber or neoprene, the heat required to liquefy the polymer also destroys the polymer as well as the high degree of crystallinity desirable for a suitable binder. In order to obviate this problem and produce a suitable binder, a latex of the polymer was coprecipitated with an oil emulsion having the same rubber to oil ratio as in the heating procedure.

The critical chemical is then encapsulated in the binder by feeding the heated binder into a high-speed mixer containing the critical chemical in solid particulate form. Rapid mixing continues until the critical chemical is dispersed and free of agglomeration. The encapsulated critical chemical can then be formed into pellets, strips, bands, briquettes, bars, cylinders and the like.

Critical chemicals encapsulated in accordance with the present invention in addition to being uniform, well predispersed, and almost completely encapsulated, are non-blocking, i.e., free-flowing, can be accurately weighed and are rapidly, uniformly and thoroughly dispersed in the rubber or plastic compound to which they are ultimately added.

DESCRIPTION OF THE PREFERRED EMBODIMENTS

In accordance with the present invention, critical chemicals are encapsulated in a binder comprising a high molecular weight polymer and at least one additional component selected from liquids compatible with the rubber or plastic compound to which the critical chemical is ultimately to be added, and waxes. A minor amount of a fine powder reinforcing agent can also be included in the binder composition if desired.

The binder composition generally comprises from about 80 to about 98 percent by weight of (i) a liquid compatible with the rubber or plastic compound to which the critical chemical is ultimately to be added and with the other ingredients in the binder, or (ii) a wax, or both. Suitable liquids include aromatic, naphthenic and paraffinic rubber process and extender oils, chemical plasticizers, such as dioctyl phthalate, and the like. Suitable waxes have a sharp melting point in the range of about 55°–80° C.

The binder composition additionally comprises a high molecular weight polymer. The chemical composition of the polymer may vary considerably as long as the binder prepared therefrom exhibits certain important physical and chemical characteristics and properties. In accordance with the present invention, the binder comprises a compatible liquid and/or wax, as defined above, and any high molecular weight polymer which, when combined with the other binder ingredients either by mixture or coagulation therewith, produces a non-tacky gel below about 53° C and which, when heated above about 53° C, returns to a liquid and incorporates rapidly with the matrix of the rubber or plastic compound into which the critical chemical was intended to be incorporated. The disperse phase of the gel, i.e. the high molecular weight polymer, should have a molecular weight of at least about 50,000 and preferably should contain crystallites with some tendency towards gel to maximize viscosity with minimum polymer concentration. Suitable high molecular weight polymers include EPDM (a polymer made from ethylene, propylene and diene monomers), Hypalon (chlorosulfonated polyethylene), natural rubber, high strength, fast crystallization rate neoprene, and the like. The binder composition generally comprises from about 2 to about 20 percent by weight of the highly crystalline polymer. If crystalline EPDM is used, only about 3–10 percent is required to make a suitable binder, whereas if natural rubber or neoprene is used, a much larger percent, in the order of 12–15 percent is required. Because of the lower specific gravity and longer chain length of EPDM, less is needed to prepare the binder.

In certain circumstances, it is advantageous to include a very small amount of a fine powder reinforcing agent. The incorporation of this minor amount of essentially submicron particle size material reinforces the rubbery nature of the binder at room temperature without affecting the ability of the binder to soften at elevated temperatures, and may also act as a stabilizer for the binder. The reinforcing agent can also be used to control the flow properties of the binder, and thus to assist in controlling the free-flowing properties of the encapsulated critical chemical. Suitable reinforcing agents include fumed colloidal silica, e.g., Cab-O-Sil, hydrated amorphous silica, e.g., Hi Sil, carbon black, bentonite, fumed litharge or other high surface area metallic oxides, attapulgite, and the like. Generally, the binder compositions comprise less than about 3 percent by weight of such reinforcing agents.

The products resulting from encapsulation of critical chemicals in accordance with the present invention comprise from about 60 to about 95 percent by weight of critical chemical and from about 5 to about 40 percent by weight of binder. At least about 5 percent by weight of binder is required in order to ensure complete encapsulation of the critical chemical with at least a monomolecular layer of binder. More than this minimum is needed in order to enable the very fine chemical in its binder envelope to mass slightly thereby minimizing dusting. Generally, 5 percent by weight of binder is all that is required to encapsulate a high specific gravity, large particle size critical chemical such as calcined litharge. Critical chemicals of lower specific gravity and larger surface area may require as much as 40 percent by weight of binder. Although it is generally desirable to obtain the highest concentration of critical chemical with the lowest amount of binder that will completely encapsulate the chemical, under certain circumstances it may be desirable to obtain low concentrations of critical chemical. In those cases, an inert ingredient can be used to dilute the critical chemical in order to maintain the binder below about 40 percent.

The binder compositions discussed above are prepared in accordance with one of the following processes. Initially in each process, the liquid or wax component used to form the binder is heated to about 60°–150° C, and preferably to about 110°–135° C. In binder systems in which the primary components are a high molecular weight, heat stable polymer and a wax, the polymer is added to the heated wax under slow agitation at a temperature sufficiently high to liquefy the polymer until a homogeneous blend of the binder components is obtained. If desired, a minor amount of the fine powder reinforcing agent may be added to the heated wax just prior to or simultaneously with the addition of the polymer. In binder systems comprising a heat stable, high molecular weight polymer and a liquid, and in those comprising the polymer, liquid and wax as their primary components, the polymer is added to the heated liquid under slow agitation at a sufficiently elevated temperature to liquefy the polymer. The wax, if required, is then added under slow agitation. If a minor amount of a fine powder reinforcing agent is to be included in the binder, it may be added to the heated liquid simultaneously with the polymer.

When unsaturated, heat sensitive, high molecular weight polymers, such as natural rubber or neoprene, are employed in the binder compositions of the present invention, the long times at elevated temperatures required to dissolve the polymer destroy the polymer structure as well as its high crystallinity. A suitable binder for encapsulating critical chemicals in accordance with the present invention can be prepared using these polymers and a compatible liquid and/or wax as defined above if the polymers are added in the latex form. The polymer and compatible liquid and/or wax are present in the binder composition in the same percentages by weight given above for the other binder compositions. First, an emulsion of the compatible liquid and/or wax is prepared by placing a hot soap solution containing fatty soap in a blender to which is added heated compatible liquid and/or wax while agitating at high speed. The emulsion of compatible liquid and/or wax so prepared is then mixed with the polymer latex and the mixture is coagulated with a coagulating agent. The resulting semi-solid gelled dispersion is then washed with water and dried. Using each of the processes described above, a homogeneous binder material is formed which is a non-tacky gel below about 53° C and which, when heated to above about 53° C, returns to a liquid and incorporates rapidly with the matrix of the rubber or plastic compound into which it ultimately is to be incorporated.

The critical chemical is then encapsulated in any of the binders prepared in accordance with the processes outlined above by feeding heated binder into a high-speed mixer, such as a Henschel mixer, which contains the critical chemical in a solid fine particulate form. This rapid mixing procedure keeps the chemical particles separated so that virtually every particle is discretely encapsulated rather than agglomerated during the mixing. This mixing continues for a period of about ½ to 10 minutes until a uniform product is obtained. The resulting product is a high weight percent concentration of critical chemical encapsulated in a binder which is in the form of irregularly shaped particles.

The particles obtained from the high-speed mixer can be used as is or formed into another shape if desired. They can be formed into small non-blocking, uniformly shaped masses that are dust-free, such as pearls, granules, pellets, strips, bands, briquettes, bars, cylinders and the like. This forming can be done by any of the ways well known to those skilled in the art, such as rolling, discing, briquetting, extruding, and the like. The formed material is shaped at a temperature at which the binder is formable, soft and tacky. Below about 53° C., the binder is a non-tacky gel. The temperature is generally kept below 80° C., however, in order to minimize the heat history of the critical chemical. If the forms are heated too high and take too long to cool, they may mass into a bigger particle than desired and use more energy than required to do the job. When these forms or shapes are prepared and subsequently cooled, they unexpectedly exhibit resistance to re-massing, i.e., cold flow. Although they are firm at room temperature, they are sufficiently soft to be incorporated rapidly into a batch of plastic or rubber compound and to distribute the critical chemical uniformly and completely therein.

Critical chemicals encapsulated in accordance with the present invention exhibit various outstanding advantages. There is excellent predispersion of a high concentration of critical chemicals in a binder system which not only wets the chemicals but also is highly compatible with the rubber or plastic compound to which the chemical must ultimately be added. Since the particles of critical chemical are almost completely encapsulated by at least a monomolecular layer of binder, the product is dust-free and easy to handle. The encapsulation provides a physical barrier against environmental hazards, such as moisture, oxidation, carbonation, and the like which can cause alteration or degradation of the chemical. It also provides a barrier against release of dust and/or chemical reaction products and by-products of the critical chemical to the environment, thereby protecting those that handle the product from irritating or toxic chemicals. In addition to being dust-free, the encapsulated chemicals are highly shelf stable.

Prior to the present invention, masterbatches of critical chemicals could be chopped to pellet size to facilitate handling and weighing. Such pellets, however, frequently exhibited cold flow and remassed, precluding accurate handling and weighing, particularly in automatic weighing equipment. The pellets, granules and other shapes formed in accordance with the present invention unexpectedly exhibit good thermoplasticity and excellent resistance to remassing and do not flow together to form large masses at room temperature.

Because of the small particle size to which the critical chemicals are ground and their excellent predispersion, the encapsulated chemicals are not partially agglomerated and, therefore, are able to react more readily with the rubber or plastic compound to which they are added. Thus, a lower amount of critical chemical is required to achieve the same result, and the cost of converting the rubber or plastic compounds to finished goods is reduced.

The product of the present invention is in the same form as the rubber or plastic compound to which it ultimately is to be added, viz. a relatively low viscosity thermoplastic solid, which softens to a near liquid at temperatures within the range used in processing polymers while unexpectedly developing tack. As a result, the product rapidly and homogeneously disperses into the rubber or plastic compound to which it ultimately is to be added. The finished goods exhibit more uniform physical and electrical properties and greater homogeneity.

A more complete appreciation of the invention will be realized by reference to the following specific examples relating to specific compounds, binder compositions and processes for encapsulating critical chemicals. The following examples are not intended to limit the invention disclosed herein except to the extent that limitations are specifically stated or to the extent to which limitations appear in the appended claims.

EXAMPLE 1

A binder for encapsulating critical chemicals was prepared by first heating 69.7 percent by weight of a paraffinic rubber process oil (Flexon 845, sp. gr. 0.868, made by Exxon) to a temperature of 110°–135° C under slow agitation. This temperature range was then maintained throughout the preparation of the binder. To the heated oil was added 8.3 percent by weight of ethylene-propylene terpolymer (Nordel 1560, sp. gr. 0.86, made by E. I. duPont deNemours and Co.) under slow agitation. Mixing continued for about 24 hours until a uniform mixture was obtained. Then 22.0 percent by weight of wax (Paraffin 4415 Wax, m.p. 61° C, sp. gr. 0.78, made by Sunoco) was added to the mixture and mixing was continued for 30 minutes until a homogeneous binder was obtained.

EXAMPLE 2

A binder for encapsulating critical chemicals was prepared by first heating 45.2 percent by weight of a paraffinic rubber process oil (Flexon 845) to a temperature of 110°–135° C under slow agitation. This temperature range was then maintained throughout the preparation of the binder. To the heated oil was added 4.0 percent by weight of ethylene-propylene terpolymer (Nordel 1560) and 0.8 percent by weight of fumed colloidal silica (Cab-O-Sil M5, sp. gr. 2.20, made by Cabot). Mixing continued for about 16 hours until a uniform mixture was obtained. To this mixture was added 50.0 percent by weight of wax (Paraffin 4415 Wax) and mixing was continued for 30 minutes until a homogeneous binder was obtained.

EXAMPLE 3

A binder for encapsulating critical chemicals was prepared by first heating 89.0 percent by weight of a paraffinic rubber process oil (Flexon 845) to a temperature of 110°–135° C under slow agitation. This temperature range was then maintained throughout the preparation of the binder. To the heated oil was added 9.0 percent by weight of ethylene-propylene terpolymer (Nordel 1560) and 2.0 percent by weight of fumed colloidal silica (Cab-O-Sil M5) mixing continued for about 16 hours until a homogeneous binder was obtained.

EXAMPLE 4

A binder for encapsulating critical chemicals was prepared by first mill mixing 11.7 percent by weight of chlorosulfonated polyethylene (Hypalon 45, sp. gr. 1.27, made by E. I. duPont deNemours and Co.), 2.3 percent by weight of tribasic lead sulfate (Tribase, sp. gr. 6.40, made by National Lead) and 5.5 percent by weight of dioctyl phthalate (Sp. gr. 0.985, made by Harwick) together as a masterbatch. The masterbatch was then cut into ½ inch cubes. An additional 55.5 percent by weight of dioctyl phthalate was then heated to 110°–135° C to which were added the cubes of masterbatch under slow agitation. Mixing continued for about 8–10 hours until a uniform mixture was obtained. Then 25.0 percent by weight of wax (Paraffin 4415 Wax) was added to the mixture and mixing was continued for 30 minutes until a homogeneous binder was obtained.

EXAMPLE 5

A binder for encapsulating critical chemicals was prepared by first mill mixing 6.0 percent by weight of chlorosulfonated polyethylene (Hypalon 45), 0.8 percent by weight of magnesium oxide (Elastomag 100, sp. gr. 3.10, made by Morton Chemical) and 1.2 percent by weight of an aromatic rubber process oil (Sundex 790, sp. gr. 0.981, made by Sunoco) together as a masterbatch, which was subsequently cut into ½ inch cubes. An additional 67.0 percent by weight of aromatic rubber process oil was then heated to 110°–135° C to which were added the cubes of masterbatch under slow agitation. Mixing continued for about 24–36 hours until a uniform mixture was obtained. Then 25.0 percent by weight of wax (Paraffin 4415 Wax) was added to the mixture and mixing continued for 30 minutes until a homogeneous binder was obtained.

EXAMPLE 6

A binder for encapsulating critical chemicals was prepared by first mill mixing 6.8 percent by weight of chlorosulfonated polyethylene (Hypalon 45), 0.7 percent by weight of fumed litharge (sp. gr. 9.50, made by National Lead) and 1.0 percent by weight of aromatic rubber process oil (Sundex 790) together as a masterbatch. The masterbatch was then cut into ½ inch cubes. An additional 66.5 percent by weight of aromatic rubber process oil (Sundex 790) was then heated to 110°–135° C to which were added the cubes of masterbatch under slow agitation. Mixing continued for about 24–36 hours until a uniform mixture was obtained. Then 25.0 percent by weight of wax (Paraffin 4415 Wax) was added to the mixture and mixing was continued for 30 minutes until a homogeneous binder was obtained.

EXAMPLE 7

A binder for encapsulating critical chemicals was prepared with neoprene rubber by modifying the procedures used in Examples 1–6 above. Initially, a 25 percent emulsion of dioctyl phthalate was prepared by placing 300.0 grams of hot soap solution containing 5.0 grams of a blend of fatty acid soaps (CP-64, sp. gr. 0,93, made by Proctor & Gamble) in a Waring Blender, and while agitating at high speed, slowly adding 100.0 grams of hot dioctyl phthalate. An 85 percent dioctyl phthalate dispersion with 15 percent neoprene rubber was then prepared by mixing 15.0 grams of a polychloroprene polymer latex (Neoprene 400, sp. gr. 1.15, made by E. I. duPont de Nemours, 50.0% TS) with 170.0 grams of the 25 percent dioctyl phthalate emulsion in a 1 liter beaker and coagulating the mixture with 400.0 ml. of a solution containing 30.0 grams of $MgSO_4.7H_2O$. The magnesium ion was chosen as the coagulating agent to provide a greater degree of stability to the neoprene binder, and hence, greater shelf life. The resulting semi-solid gelled oil dispersion was then removed from the beaker, washed with water, and dried overnight in a forced air oven at about 50° C.

EXAMPLE 8

A binder for encapsulating critical chemicals was prepared with natural rubber using the procedure of Example 7 above. First, a 25 percent emulsion of naphthenic rubber process oil (Circosol 4240, sp. gr. 0.949, made by Sun Oil) was prepared by placing 300.0 grams of hot soap solution containing 5.0 grams of a blend of fatty acid soaps (CP-64) in a Waring Blender, and while agitating at high speed, slowly adding 100.0 grams of hot naphthenic rubber process oil. An 85 percent naphthenic rubber process oil dispersion with 15 percent natural rubber was then prepared by mixing 11.54 grams of natural rubber latex (65% TS) with 170.0 grams of the 25 percent naphthenic rubber process oil emulsion in a 1 liter beaker and coagulating the mixture with 400.0 ml. of a solution containing 15.0 grams of $ZnSO_4.7H_2O$. The resulting semi-solid gelled oil dispersion was removed from the beaker, washed with water and dried overnight in a forced air oven at about 50° C.

EXAMPLE 9

A binder for encapsulating critical chemicals was prepared with neoprene rubber as follows. First, a 25 percent emulsion of a naphthenic rubber process oil (Flexon 641, sp. gr. 0.90, made by Exxon) was prepared by placing 300.0 grams of hot soap solution containing 5.0 grams of a blend of fatty acid soaps (CP-64) in a Waring Blender, and while agitating at high speed, slowly adding 100.0 grams of hot naphthenic rubber process oil. Then, a 25 percent emulsion of wax (Paraffin 4415 wax) was prepared by placing 300.0 grams of hot soap solution containing 5.0 grams of a blend of fatty acid soaps (CP-64) in a Waring Blender and slowly adding 100.0 grams of molten wax to the solution while agitating at high speed. An 80 percent naphthenic rubber process oil dispersion with 15 percent neoprene rubber and 5 percent wax was then prepared by mixing 15.0 grams of a polychloroprene polymer latex (Neoprene 400), 10.0 grams of paraffin wax emulsion, and 160.0 grams of naphthenic rubber process oil emulsion in a 1 liter beaker and coagulating the mixture with 400.0 ml. of a solution containing 30.0 grams of $MgSO_4.7H_2O$. The magnesium ion was chosen as the coagulating agent to provide a greater degree of stability to the neoprene binder. The resulting semi-solid gelled oil dispersion was removed from the beaker, washed with water and dried overnight in a forced air oven at about 50° C.

EXAMPLE 10

Sulfur, a critical chemical, was encapsulated with the binder produced in Example 1 above. Initially, 88 percent by weight of sulfur was introduced into a high-speed mixer and mixed for 30 seconds at 1000 rpm to break up the lumps of sulfur. Then, 12 percent by weight of the binder prepared in Example 1 was heated to 122° C and injected into the mixer. The mixing was continued for a total of 90 seconds at 1000 rpm. Then two additional mixings for 15 seconds at 750 rpm were run to make a uniform product. The final product temperature at dump was 48° C.

EXAMPLE 11

Following the procedure of Example 10 above, 84.0 percent by weight of sulfur was introduced into a high-speed mixer and mixed for 30 seconds at 1000 rpm to break up the lumps of sulfur. Then, 16 percent by weight of the binder prepared in Example 9 was heated to 108° C and injected into the mixer. The mixing was continued for a total of 90 seconds at 1000 rpm, and then two additional mixings for 15 seconds at 750 rpm were run to make a uniform product. The final product temperature at dump was 45° C.

EXAMPLE 12

The following critical chemicals were introduced into a high-speed mixer in the order listed and mixed for 20 seconds at 750 rpm to combine:

| Weight Percent | Critical Chemical |
|---|---|
| 9.2 | stearic acid |
| 9.2 | sulfur |
| 3.7 | tetramethylthiuram disulfide (sp. gr. 1.41) |
| 3.7 | tellurium diethyldithiocarbamate (sp. gr. 1.42) |
| 3.7 | depentamethylenethiuram disulfide (sp. gr. 1.50) |
| 4.6 | benzothiazyl disulfide (sp. gr. 1.44) |
| 45.9 | zinc oxide |

Then 20 percent by weight of the binder prepared in Example 3 was heated to 122° C and injected into the mixer. The mixing was continued to total 90 seconds. Two additional mixings for 15 seconds at 750 rpm were run to make a uniform products. The final products temperature at dump was 49° C.

EXAMPLE 13

In accordance with the procedures set forth above, 44 percent by weight of mercaptobenzothiazole (sp. gr. 1.47) and 44 percent by weight of tetramethylthiuram disulfide (sp. gr. 1.41) were introduced into a high-speed mixer and mixed for 20 seconds at 1000 rpm. Then 12 percent by weight of the binder prepared in Example 1 was heated to 122° C and injected into the mixer. Mixing continued for a total of 75 seconds at 1000 rpm. An additional mixing for 60 seconds at 1500 rpm was run to ensure uniformity of the product. The final product dump temperature was 38° C.

EXAMPLE 14

The critical chemical, zinc oxide, was encapsulated with the binder prepared in Example 1 above. Initially, 92 percent by weight of zinc oxide was introduced into a high-speed mixer and mixed for 20 seconds at 1000 rpm to break up the lumps of zinc oxide. Then 8 percent by weight of the binder prepared in Example 1 was heated to 122° C and injected into the mixture. The mixing was continued for a total of 90 seconds at 1000 rpm. Two additional mixings for 30 seconds at 1500 rpm were run to make a uniform product. The final product temperature at dump was 41° C.

EXAMPLE 15

Zinc oxide was encapsulated with the binder prepared in Example 8 above. First, 92 percent by weight of zinc oxide was introduced into a high-speed mixer and mixed for 15 seconds at 1000 rpm to break up the lumps. Then, 8 percent by weight of the binder prepared in Example 8 was heated to 95° C and injected into the mixer. The mixing was continued for a total of 90 seconds at 1000 rpm. Two additional mixings for 20 seconds each at 1000 rpm were run to assure uniformity of the final product. The final product temperature at dump was 38° C.

EXAMPLE 16

The accelerator, 4,4'-dithiomorpholine (Sulfasan R, sp. gr. 1.35, made by Monsanto), was encapsulated with the binder prepared in Example 2 above. First, 80 percent by weight of 4,4'-dithiomorpholine was introduced into a high-speed mixer and mixed for 10 seconds at 1000 rpm to break up the lumps. Then, 20 percent by weight of the binder prepared in Example 2 was heated to 122° C and injected into the mixer. The mixing was continued for a total of 75 seconds at 1000 rpm. Two additional mixings of 20 seconds each at 750 rpm were run to assure uniformity of the final product. The temperature of the final product at dump was 41° C.

EXAMPLE 17

A mixture of 40 percent by weight of benzothiazyl disulfide (sp. gr. 1.44) and 40 percent by weight nickel dibutyldithiocarbamate (sp. gr. 1.26) was encapsulated with the binder prepared in Example 5 above. The accelerator and the antidegradent were introduced into a high-speed mixer and mixed for 20 seconds at 1000 rpm to break up the lumps. Then, 20 percent by weight of the binder prepared in Example 5 was heated to 124° C and injected into the mixer. Mixing continued for a total of 60 seconds at 1000 rpm. An additional mixing for 10 seconds at 750 rpm was run to assure uniformity of the final product. The temperature of the final product at dump was 45° C.

EXAMPLE 18

Tribasic lead sulfate (Tribase) was encapsulated with the binder prepared in Example 4 above. Initially, 92 percent by weight of tribasic lead sulfate was introduced into a high-speed mixer and mixed for 5 seconds at 1000 rpm to break up the lumps. Then, 8 percent by weight of the binder prepared in Example 4 was heated to 124° C and injected into the mixer. Mixing was continued for a total of 30 seconds at 1000 rpm. The temperature of the final product at dump was 41° C.

EXAMPLE 19

A mixture of 40 percent by weight of dipentamethylenethiuram disulfide (Tetrone A, sp. gr. 1.50, made by E. I. duPont deNemours) and 40 percent by weight of N,N'-m-phenylene dimalemide (HVA-2, sp. gr. 1.44, made by E. I. duPont deNemours and Co.) was encapsulated with the binder prepared in Example 5 above. The accelerators were introduced into a high-speed mixer and mixed for 15 seconds at 750 rpm to break up the lumps. Then, 20 percent by weight of the binder prepared in Example 5 was heated to 124° C and injected into the mixer. Mixing was continued for a total of 75 seconds at 750 rpm. An additional mixing for 15 seconds at 750 rpm was run to assure uniformity of the final product. The temperature of the final product at dump was 41° C.

EXAMPLE 20

The vulcanizing agent, ethylene thiourea, was encapsulated with the binder prepared in Example 9 above. First, 80 percent by weight of ethylene thiourea was introduced into a high-speed mixer and mixed for 10 seconds at 750 rpm to break up the lumps. Then 20 percent by weight of the binder prepared in Example 9 was heated to 108° C and injected into the mixer. Mixing was continued for a total of 75 seconds at 750 rpm. The temperature of the final product at dump was 35° C.

EXAMPLE 21

Phenyl-beta-naphthylamine (Sp. gr. 1.21) was encapsulated with the binder prepared in Example 9 above. Initially, 80 percent by weight of the antidegradants was introduced into a high-speed mixer and mixed for 10 seconds at 1000 rpm to break up the lumps. Then, 20 percent by weight of the binder prepared in Example 9 was heated to 108° C and injected into the mixer. Mixing was continued for a total of 60 seconds at 1000 rpm. An additional mixing for 20 seconds at 750 rpm was run to assure uniformity of the final product. The final product temperature at dump was 41° C.

EXAMPLE 22

Azodicarbonamide (Celogen AZ, sp. gr. 1.63, made by Uniroyal) was encapsulated with the binder prepared in Example 7 above. Initially, 80 percent by weight of the flowing agent was introduced into a high-speed mixer and mixed for 5 seconds at 750 rpm to break up the lumps. Then, 20 percent by weight of the binder prepared in Example 7 was heated to 105° C and injected into the mixer. Mixing was continued for a total of 60 seconds at 750 rpm. The temperature of the final product at dump was 35° C.

What is claimed is:

1. A composition of matter useful for rapidly and homogeneously dispersing a critical chemical in a rubber or plastic compound, said composition comprising from about 60 to about 95 percent by weight of a critical chemcial and from about 5 to about 40 percent by weight of a binder, said binder comprising
   at least one component selected from
   (i) liquids compatible with said rubber or plastic compound and with the other binder components, and
   (ii) waxes having a sharp melting point in the range of about 55°–80° C, and
   a polymer having a molecular weight of at least about 50,000 which when combined with the other binder components produces a binder which is non-tacky gel below about 53° C. and returns to a liquid above about 53° C.

2. The composition of claim 1 wherein the polymer comprises from about 2 to about 20 percent by weight of the binder.

3. The composition of claim 2 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

4. The composition of claim 1 wherein the binder further comprises a fine powder reinforcing agent for the binder.

5. The composition of claim 4 wherein the reinforcing agant comprises less than about 3 percent by weight of the binder.

6. The composition of claim 5 wherein the polymer comprises from about 2 to about 20 percent by weight of the binder.

7. The composition of claim 6 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

8. A composition of matter useful for rapidly and homogeneously dispersing a critical chemical in a rubber or plastic compound, said composition comprising from about 60 to about 95 percent by weight of a critical chemical and from about 5 to about 40 percent by weight of a binder, said binder comprising a liquid compatible with said rubber or plastic compound and with the other binder components, and a polymer having a molecular weight of at least about 50,000 which when combined with the other binder components produces a binder which is a non-tacky gel below about 53° C. and returns to a liquid above about 53° C.

9. The composition of claim 8 wherein the liquid comprises from about 80 to about 98 percent by weight of the binder and the polymer comprises from about 2 to about 20 percent by weight of the binder.

10. The composition of claim 9 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

11. The composition of claim 10 wherein the liquid is dioctyl phthalate and the polymer is neoprene rubber.

12. The composition of claim 10 wherein the liquid is a rubber process oil and the polymer is natural rubber.

13. The composition of claim 8 wherein the binder further comprises a fine powder reinforcing agent for the binder.

14. The composition of claim 13 wherein the reinforcing agent comprises less than about 3 percent by weight of the binder.

15. The composition of claim 14 wherein the polymer comprises from about 2 to about 20 percent by weight of the binder.

16. The composition of claim 15 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

17. The composition of claim 16 wherein the liquid is rubber process oil, the polymer is an ethylene-propylene terpolymer, and the reinforcing agent is fumed collidal silica.

18. The composition of claim 16 wherein the liquid is dioctyl phthalate, the polymer is chlorosulfonated polyethylene, and the reinforcing agent is tribasic lead sulfate.

19. A composition of matter useful for rapidly and homogeneously dispersing a critical chemical in a rubber or plastic compound, said composition comprising from about 60 to about 95 percent by weight of a critical chemical and from about 5 to about 40 percent by weight of a binder, said binder comprising a wax having a sharp melting point in the range of about 55°–80° C, and a polymer having a molecular weight of at lest about 50,000 which when combined with the other binder component produces a binder which is a non-tacky gel below about 53° C. and returns to a liquid above about 53° C.

20. The composition of claim 19 wherein the wax comprises from about 80 to about 98 percent by weight of the binder and the polymer comprises from about 2 to about 20 percent by weight of the binder.

21. The composition of claim 20 wherein the polymer is selected from the group consisting of chlorosulfonated polyethylene, ethylene-propylene terpolymers, natural rubber and neoprene.

22. The composition of claim 19 wherein the binder further comprises a fine powder reinforcing agent for the binder.

23. The composition of claim 22 wherein the reinforcing agent comprises less than about 3 percent by weight of the binder.

24. The composition of claim 23 wherein the wax comprises from about 80 to about 98 percent by weight of the binder and the polymer comprises from about 2 to about 20 percent by weight of the binder.

25. The composition of claim 24 wherein the polymer is selected from the group consisting of chlorosulfonated polyethylene, ethylene-propylene terpolymers, natural rubber and neoprene.

26. A composition of matter useful for rapidly and homogeneously dispersing a critical chemical in a rubber or plastic compound, said composition comprising from about 60 to about 95 percent by weight of a critical chemical and from about 5 to about 40 percent by weight of a binder, said binder comprising a liquid compatible with said rubber or plastic compound and with the other binder components, a wax having a sharp melting point in the range of about 55°–80° C, and a polymer having a molecular weight of at least about 50,000 which when combined with the other binder components produces a binder which is a non-tacky gel below about 53° C. and returns to a liquid above about 53° C.

27. The composition of claim 26 wherein the liquid and the wax comprise from about 80 to about 98 percent by weight of the binder and the polymer comprises from about 2 to about 20 percent by weight of the binder.

28. The composition of claim 27 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

29. The composition of claim 28 wherein the liquid is rubber process oil and the polymer is an ethylene-propylene terpolymer.

30. The composition of claim 28 wherein the liquid is rubber process oil and the polymer is neoprene rubber.

31. The composition of claim 26 wherein the binder further comprises a fine powder reinforcing agent for the binder.

32. The composition of claim 31 wherein the reinforcing agent comprises less than about 3 percent by weight of the binder.

33. The composition of claim 32 wherein the liquid and the wax comprise from about 80 to about 98 percent by weight of the binder and the polymer comprises from about 2 to about 20 percent by weight of the binder.

34. The composition of claim 33 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

35. The composition of claim 34 wherein the liquid is rubber process oil, the polymer is an ethylene-propylene terpolymer, and the reinforcing agent is fumed colloidal silica.

36. The composition of claim 34 wherein the liquid is rubber process oil, the polymer is chlorosulfonated polyethylene, and the reinforcing agent is magnesium oxide.

37. The composition of claim 34 wherein the liquid is rubber process oil, the polymer is chlorosulfonated polyethylene, and the reinforcing agent is fumed litharge.

38. A binder for encapsulating critical chemicals which are to be rapidly and homogeneously dispersed in a rubber or plastic compound, said binder comprising at least one component selected from
(i) liquids compatible with said rubber or plastic compound and with the other binder components, and
(ii) waxes having a sharp melting point in the range of about 55°–80° C, and
a polymer having a molecular weight of at least about 50,000 which when combined with the other binder components produces a binder which is a non-tacky gel below about 53° C. and returns to a liquid above about 53° C.

39. The binder of claim 38 wherein the polymer comprises from about 2 to about 20 percent by weight of the binder.

40. The binder of claim 39 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

41. The binder of claim 38 further comprising a fine powder reinforcing agent.

42. The binder of claim 41 wherein the reinforcing agent comprises less than about 3 percent by weight of the binder.

43. The binder of claim 42 wherein the polymer comprises from about 2 to about 20 perent by weight of the binder.

44. The binder of claim 43 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

45. A binder for encapsulating critical chemicals which are to be rapidly and homogeneously dispersed in a rubber or plastic compound, said binder comprising a liquid compatible with said rubber or plastic compound and with the other binder components, and a polymer having a molecular weight of at least about 50,000 which when combined with the other binder components produces a binder which is a non-tacky gel below about 53° C. and returns to a liquid above about 53° C.

46. The binder of claim 45 wherein the liquid comprises from about 80 to about 98 percent by weight of the binder and the polymer comprises from about 2 to about 20 percent by weight of the binder.

47. The binder of claim 46 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

48. The binder of claim 47 wherein the liquid is dioctyl phthalate and the polymer is neoprene rubber.

49. The binder of claim 47 wherein the liquid is rubber process oil and the polymer is natural rubber.

50. The binder of claim 45 further comprising a fine powder reinforcing agent.

51. The binder of claim 50 wherein the reinforcing agent comprises less than about 3 percent by weight of the binder.

52. The binder of claim 51 wherein the liquid comprises from about 80 to about 98 percent by weight of the binder and the polymer comprises from about 2 to about 20 percent by weight of the binder.

53. The binder of claim 52 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

54. The binder of claim 53 wherein the liquid is rubber process oil, the polymer is an ethylene-propylene terpolymer, and the reinforcing agent is fumed colloidal silica.

55. The binder of claim 53 wherein the liquid is dioctyl phthalate, the polymer is chlorosulfonated polyethylene, and the reinforcing agent is tribasic lead sulfate.

56. A binder for encapsulating critical chemicals which are to be rapidly and homogeneously dispersed in a rubber or plastic compound, said binder comprising a wax having a sharp melting point in the range of about 55°–80° C, and a polymer having a molecular weight of at least about 50,000 which when combined with the other binder components produces a binder which is a non-tacky gel below about 53° C. and returns to a liquid above about 53° C.

57. The binder of claim 56 wherein the wax comprises from about 80 to about 98 percent by weight of the binder and the polymer comprises from about 2 to about 20 percent by weight of the binder.

58. The binder of claim 57 wherein the polymer is selected from the group consisting of chlorosulfonated polyethylene, ethylene-propylene terpolymers, natural rubber and neoprene.

59. The binder of claim 56 further comprises a fine powder reinforcing agent.

60. The binder of claim 59 wherein the reinforcing agent comprises less than about 3 percent by weight of the binder.

61. The binder of claim 60 wherein the wax comprises from about 80 to about 98 percent by weight of the binder and the polymer comprises from about 2 to about 20 percent by weight of the binder.

62. The binder of claim 61 wherein the polymer is selected from the group consisting of chlorosulfonated polyethylene, ethylene-propylene terpolymers, natural rubber and neoprene.

63. A binder for encapsulating critical chemicals which are to be rapidly and homogeneously dispersed in a rubber or plastic compound, said binder comprising a liquid with said rubber or plastic compound and with the other binder components, a wax having a sharp melting point in the range of about 55°–80° C, and a polymer having a molecular weight of at least about 50,000 which when combined with the other binder components produces a binder which is a non-tacky gel below about 53° C. and returns to a liquid above about 53° C.

64. The binder of claim 63 wherein the liquid and the wax comprise from about 80 to about 98 percent by weight of the binder and the polymer comprises from about 2 to about 20 percent by weight of the binder.

65. The binder of claim 64 wherein the liquid is selected from the group consisting of rubber process and extender oils and chemical plasticizers, and the polymer is selected from the group consisting of chlorosulfonated polyethylene, ethylene-propylene terpolymers, natural rubber and neoprane.

66. The binder of claim 65 wherein the liquid is rubber process oil and the polymer is an ethylene-propylene terpolymer.

67. The binder of claim 65 wherein the liquid is rubber process oil and the polymer is neoprene rubber.

68. The binder of claim 63 further comprising a fine powder reinforcing agent.

69. The binder of claim 68 wherein the reinforcing agent comprises less than about 3 percent by weight of the binder.

70. The binder of claim 69 wherein the liquid and the wax comprise from about 80 to about 98 percent by weight of the binder and the polymer comprises from about 2 to about 20 percent by weight of the binder.

71. The binder of claim 70 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

72. The binder of claim 71 wherein the liquid is rubber process oil, the polymer is ethylene-propylene terpolymer, and the reinforcing agent is fumed colloidal silica.

73. The binder of claim 71 wherein the liquid is rubber process oil, the polymer is chlorosulfonated polyethylene, and the reinforcing agent is magnesium oxide.

74. The binder of claim 71 wherein the liquid is rubber process oil, the polymer is chlorosulfonated polyethylene, and the reinforcing agent is fumed litharge.

75. A process for preparing a binder for encapsulating critical chemicals which are to be rapidly and homogeneously dispersed in a rubber or plastic compound comprising
(i) heating a liquid compatible with said rubber or plastic compound and with the other binder components to a temperature in the range of about 60°–150° C under slow agitation and maintaining the temperature within this range throughout the process,
(ii) adding a heat stable polymer having a molecular weight of at least about 50,000 which when mixed with the other binder components produces a binder which is a non-tacky gel below about 53° C and returns to a liquid above about 53° C., under slow agitation, and
(iii) mixing the binder components until a homogeneous binder is obtained.

76. The process of claim 75 wherein a fine powder reinforcing agent for the binder is added to the heated liquid simultaneously with the polymer.

77. A process for preparing a binder for encapsulating critical chemicals which are to be rapidly and homogeneously dispersed in a rubber or plastic compound comprising
   (i) heating a liquid compatible with said rubber or plastic compound and with the other binder components to a temperature in the range of about 60°–150° C under slow agitation and maintaining the temperature within this range throughout the process,
   (ii) adding a heat stable polymer having a molecular weight of at least about 50,000 which when mixed with the other binder components produces a binder which is a non-tacky gel below about 53° C and returns to a liquid above about 53° C., under slow agitation,
   (iii) adding a wax having a sharp melting point in the range of about 55°–80° C, and
   (iv) mixing the binder components until a homogeneous binder is obtained.

78. The process of claim 77 wherein a fine powder reinforcing agent for the binder is added to the heated liquid simultaneously with the polymer.

79. A process for preparing a binder for encapsulating critical chemicals which are to be rapidly and homogeneously dispersed in a rubber or plastic compound comprising
   (i) heating a wax having a sharp melting point in the range of about 55°–80° C to a temperature in the range of about 60°–150° C under slow agitation and maintaining the temperature within this range throughout the process,
   (ii) adding a heat stable polymer having a molecular weight of at least about 50,000 which when mixed with the other binder components produces a binder which is a non-tacky gel below about 53° C and returns to a liquid above about 53° C., under slow agitation, and
   (iii) mixing the binder components until a homogeneous binder is obtained.

80. The process of claim 79 wherein a fine powder reinforcing agent for the binder is added to the heated liquid prior to or simultaneously with the polymer.

81. A process for preparing a binder for encapsulating critical chemicals which are to be rapidly and homogeneously dispersed in a rubber or plastic compound comprising
   (i) preparing an emulsion of a liquid compatible with said rubber or plastic compound and with the other binder components,
   (ii) adding to the emulsion a latex of a heat sensitive polymer having a molecular weight of at least about 50,000 which when mixed with the other binder components and coagulated produces a binder which is a non-tacky gel below about 53° C and returns to a liquid above about 53° C., and
   (iii) coagulating the mixture of the emulsion and the latex.

82. The process of claim 81 wherein the coagulated mixture is washed with water and dried.

83. A process for preparing a binder for encapsulating critical chemicals which are to be rapidly and homogeneously dispersed in a rubber or plastic compound comprising
   (i) preparing an emulsion of a liquid compatible with said rubber or plastic compound and with the other binder components,
   (ii) preparing an emulsion of a wax having a sharp melting point in the range of about 55°–80° C,
   (iii) mixing the emulsions,
   (iv) adding to a mixture of the emulsions a latex of a heat sensitive polymer having a molecular weight of at least about 50,000 which when mixed with the other binder components and coagulated produces a binder which is a non-tacky gel below about 50° C and returns to a liquid above about 53° C., and
   (v) coagulating the mixture of the emulsions and the latex.

84. The process of claim 83 wherein the coagulated mixture is washed with water and dried.

85. A process for encapsulating critical chemicals, which are to be rapidly and homogeneously dispersed in a rubber or plastic compound, with a binder which comprises at least one component selected from
   (a) liquids compatible with said rubber or plastic compound and with the other binder components, and
   (b) waxes having a sharp melting point in the range of about 55°–80° C, and
a polymer having a molecular weight of at least about 50,000 which when combined with the other binder components produces a binder which is a non-tacky gel below about 53° C and returns to a liquid above about 53° C., said process comprising
   (i) introducing a critical chemical in solid fine particulate form into a high-speed mixer and mixing until the chemical is substantially free of lumps,
   (ii) heating the binder until it is a liquid, and
   (iii) injecting the heated binder into the mixer and mixing until a uniform product is obtained.

86. The process of claim 85 wherein the product is subsequently formed into a non-blocking, uniformly shaped mass.

87. A composition of matter useful for rapidly and homogeneously dispersing a critical chemical in a rubber or plastic compound, said composition comprising from about 60 to about 95 percent by weight of a critical chemical and from about 5 to about 40 percent by weight of a binder, said binder comprising
at least one component selected from
   (a) liquids compatible with said rubber or plastic compound and with the other binder components, and
   (b) waxes having a sharp melting point in the range of about 55°–80° C, and
a polymer having a molecular weight of at least about 50,000 which when combined with the other binder components produces a binder which is a non-tacky gel below about 53° C. and returns to a liquid above about 53° C., said composition prepared by the process comprising
   (i) introducing a critical chemical in solid fine particulate form into a high-speed mixer and mixing until the chemical is substantially free of lumps,
   (ii) heating the binder until it is a liquid, and
   (iii) injecting the heated binder into the mixer and mixing until a uniform product is obtained.

88. The composition of claim 87 wherein the polymer comprises from about 2 to about 20 percent by weight of the binder.

89. The composition of claim 88 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

90. The composition of claim 87 wherein the binder further comprises a fine powder reinforcing agent for the binder.

91. The composition of claim 90 wherein the reinforcing agent comprises less than about 3 percent by weight of the binder.

92. The composition of claim 91 wherein the polymer comprises from about 2 to about 20 percent by weight of the binder.

93. The composition of claim 92 wherein the liquid is selected from the group consisting of rubber process and extender oils and chemical plasticizers, and the polymer is selected from the group consisting of chlorosulfonated polyethylene, ethylene-propylene terpolymers, natural rubber and neoprene.

* * * * *